US008233185B2

(12) United States Patent
Gordon et al.

(10) Patent No.: US 8,233,185 B2
(45) Date of Patent: Jul. 31, 2012

(54) PAGE PARALLEL RIP AND CACHE TUNING IN PRINT/COPY JOB ENVIRONMENT UTILIZING PAGE DESCRIPTION LANGUAGES

(75) Inventors: Gerald S. Gordon, Rochester, NY (US); John H. Gustke, Walworth, NY (US); Scott Mayne, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1034 days.

(21) Appl. No.: 12/043,978

(22) Filed: Mar. 7, 2008

(65) Prior Publication Data

US 2009/0225369 A1 Sep. 10, 2009

(51) Int. Cl.
G06F 15/00 (2006.01)
G06F 15/16 (2006.01)
G06F 15/80 (2006.01)
H04N 1/00 (2006.01)
H04N 1/40 (2006.01)
G06T 1/20 (2006.01)
(52) U.S. Cl. .................. 358/1.18; 358/401; 358/426.06; 358/448; 345/504; 345/505; 345/506
(58) Field of Classification Search ................ 358/1.18, 358/1.15, 1.13, 1.16, 1.17, 540, 401, 426.06; 718/102, 105; 345/504, 505, 506
See application file for complete search history.

(56) References Cited

U.S. PATENT DOCUMENTS

| 5,819,014 | A | 10/1998 | Cyr et al. | |
|---|---|---|---|---|
| 6,157,469 | A | 12/2000 | Mestha | |
| 6,441,919 | B1 * | 8/2002 | Parker et al. | 358/1.18 |
| 6,662,270 | B1 * | 12/2003 | Sans et al. | 711/118 |
| 7,161,705 | B2 | 1/2007 | Klassen | |
| 7,391,529 | B2 * | 6/2008 | Glaspy et al. | 358/1.18 |
| 2004/0196496 | A1 * | 10/2004 | Klassen | 358/1.15 |
| 2006/0187488 | A1 * | 8/2006 | Sakamoto | 358/1.18 |
| 2009/0161163 | A1 * | 6/2009 | Klassen et al. | 358/1.18 |

* cited by examiner

*Primary Examiner* — Benny Q Tieu
*Assistant Examiner* — Ngon Nguyen
(74) *Attorney, Agent, or Firm* — Philip E. Blair; Fleit Gibbons Gutman Bongini & Bianco P.L.

(57) ABSTRACT

What is provided are a system and method for print/copy job environments utilizing a page description language (PDL). In one embodiment, an input PDL stream describing embedded objects in a job is received and parsed. Reusable document components (RDCs) are identified. A determination is made as to how many placements are in the PDL for each identified RDC. If no RDCs are placed more than once, caching is disabled. If it is not efficient to split the PDL stream into smaller tasks, page parallel rip (PPR) is disabled. The embedded objects are analyzed to determine a number of PPRs for the job based on system resources. A raster image processing (RIP) time is projected for each path in the job based on the determined number of placements and the determined number of PPRs. A job processing path is prescribed for the job based on the most efficient projected RIP time.

21 Claims, 2 Drawing Sheets

PAGE PARALLEL RIP AND CACHE TUNING IN PRINT/COPY JOB ENVIRONMENT UTILIZING PAGE DESCRIPTION LANGUAGES

TECHNICAL FIELD

The present invention is directed to systems and methods for automatically determining when to invoke a job processing path based on data extracted from a page description language.

BACKGROUND

Generating print-ready documents to be printed by a printing system involves acquiring the information (content, graphics, production specs, etc.) required to view, process and output the desired document in an electronic form understandable by a print engine. Such systems can range from those that are simple and modestly expensive such as are well known to consumer users of personal computer systems, up to commercial printing systems that are capable of generating in the range of one hundred pages per minute in full color. Most systems tend to have a high-level objective of printing faster.

Typically printing systems bundle the processing, copy and print phases of printing into a single component. When data is actually to be printed, the rate at which the printer can print is dependent on the data type, its complexity and the computer processing power available for the data computations. Generally, a print system receives a "job" to be printed. The job is all of the data that is to be printed and can be stored either in electronic form or received as hard copy, such as publications or manuscripts which are "scanned" into the printing system. Each job is formatted in the system in a Page Description Language (PDL) such as PostScript file, ANSI, ASCII, PCL etc. A Page Description Language can be defined as a language which describes the appearance of a printed page.

In one printing system, a print engine is coupled to a controller which receives the input data in a non-rasterized PDL format, and processes the input data into a rasterized image as, e.g., a bit map. The rasterized image is then fed to the print engine for printing. One problem with this type of printing system is that the processing time in the controller to rasterize the data and transfer it to the print engine can slow the print engine's ability to print the data at full-rated speed, i.e., the print engine cannot receive data as fast as it can print. For example, uncomplicated data such as ASCII text can easily be translated at speeds greater than the print engine can print. However, if the complexity of the data is increased to include PostScript files and graphics then the rasterization speed can be reduced. Thus, the print system cannot operate in "real-time" as would be advantageous to process and print extremely large amounts of data.

A further problem with traditional printing systems is that jobs are often sent serially to the controller which is specifically designed to translate the job to a printable image. As the print jobs are input in series to the printer, a bottleneck can form at the printer because a second print job must wait to be processed while the first print job is being translated to a rasterized image by the controller. In both instances, the print engine remains idle thus wasting time and resources.

Several approaches have been developed to make printing faster. For example, faster serial processing utilizes optimized software and more expensive processors to increase job throughput. However, software optimization has its limits and faster processors are also limited by currently available technology.

Job parallel processing sends separate jobs to separate systems and then prints them on a common printer in an effort to increase printing speeds. One system which exploits job parallelism can be found in U.S. Pat. No. 5,819,014 which describes a printer architecture using network resources to create a distributed printer controller or translator. By distributing the translators across the network, print jobs may be processed in parallel. Each job is formatted in the system in a particular data type comprising a PDL such as a PostScript file, ASCII, PCL, etc. A distributed set of the translators is used for each data type, the translators each comprising a plurality of CPUs to simultaneously rasterize each data type. In real time operation, each translator on the network can formulate the rasterized image which is then fed over the network to the print engine. Job parallelism increases the flexibility of the printing system by allowing slow jobs to be processed while quicker jobs are completed and printing. However, job parallel processing often results in poor single job performance, unpredictable job time, and reduced throughput when there is only one long job in the queue.

Portable Document Format (PDF) based page parallel systems convert a job to PDF and then split the PDF file into pages which are converted to print-ready form on multiple independent processors, with the job being printed on a common printer. However, existing PDF-based solutions can be relatively slow due to their need to often convert from a different input language into PDF and then write the PDF file into an input spool disk. Also, page parallel processing often suffers from throughput inefficiencies because per-job overhead typically occurs on a per-page basis.

One environment which exploits page parallelism is Adobe Extreme. In this system the data input for a print job is normalized into a PDF format and stored on disk. The PDF format is essentially page independent guaranteed and thus facilitates segregating the job into page units for page parallel processing. A sequencer processing node takes the PDF jobs off the disk and writes them back onto a disk again a page at a time as individual files, one file per page. Rasterizing image processing nodes (RIP nodes) then convert the files into a print-ready form acceptable by a print engine. A RIP or Raster Image Processor generates bitmap images from a PDL stream.

Poor print performance on complex jobs can be particularly highlighted when the wrong combinations of printer settings such as, Page Parallel Rip (PPR), Caching, PPR-Caching, are chosen for a print job. Combinations of Page Parallel Rips and Caching can negatively impact the performance of a print job. Poor RIP performance cost time and money. This is especially true when the PDL contains complex printer settings such as, for example, embedded z-sort data, Variable-data Intelligent Personalized Postscript (VIPP), VIPP-Line Command Mode (LCM) data, Line Command Data Stream (LCDS) container data, and Data Base Master Files (DBMF).

Accordingly, what is needed in this art are increasingly sophisticated systems and method for improving efficiency and speed in systems which is not limited to job or page parallelism and which facilitates flow of a job in a print/copy environment.

BRIEF SUMMARY

What is provided are a novel system, method, and computer program product for cache tuning for print/copy job environments utilizing complex settings described in a page description language (PDL).

In one example embodiment, an input page description language stream describing embedded objects in a job is received and parsed. Reusable document components are identified in the received input. A record of the parsed input can be stored in a configuration database containing a location of reusable objects and their location in the job. A determination is made as to how many placements are in the page description language for each identified reusable document component. If no reusable document components are placed more than once, caching is disabled. If it is not efficient to split the page description language into smaller tasks, page parallel rip is disabled. The embedded objects are analyzed to determine a number of page parallel rips for the job. The number of page parallel rips for the job is based on system resources. A raster image processing time is projected for each path in the job based on the determined number of placements and the determined number of page parallel rips. A job processing path is prescribed for the job based on the projected raster image processing time.

In another embodiment, a performance time constraint is estimated for at least one of: caching, page parallel rip decision-making, page description language splitting time, raster image processing setup time, form processing time, reusable document component creation overhead time, reusable document component placement time, time for propagation of reusable document components to other page parallel rip processes; and non-reusable page description language component processing time. The estimated performance time constraint is further utilized in the prescribing of the job processing path. A heuristic can be used to approximate one or more of the performance time constraints.

The subject matter disclosed herein will next be described in connection with certain illustrated embodiments. It should be understood that various changes and modifications can be made by those skilled in the art without departing from the spirit or scope of the invention.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided are a system and method for cache tuning for print-job environments utilizing complex settings described in a page description language.

It should be understood that one of ordinary skill in this art would be readily familiar with many facets of document processing in a print job or copy job environment, such as raster image processing, page parallel rip, page description language, embedded objects, reusable document components, portable document format, and the like, and be readily familiar with the other terms herein. One of ordinary skill in this art would also be knowledgeable about software and programming sufficient to implement the functionality and capabilities described herein in their own job processing environments without undue experimentation.

As used herein, a Page Description Language (PDL) is a language which describes the appearance of a printed page. A Reusable Document Component (RDC) is a form specified object within the PDL that can be cached for one or more efficient placements. A Raster Image Processor (RIP) generates bitmap images from a PDL stream. A Page Parallel Rip (PPR) is a RIP that processes subsets of pages from a PDL stream simultaneously.

Figure 1:
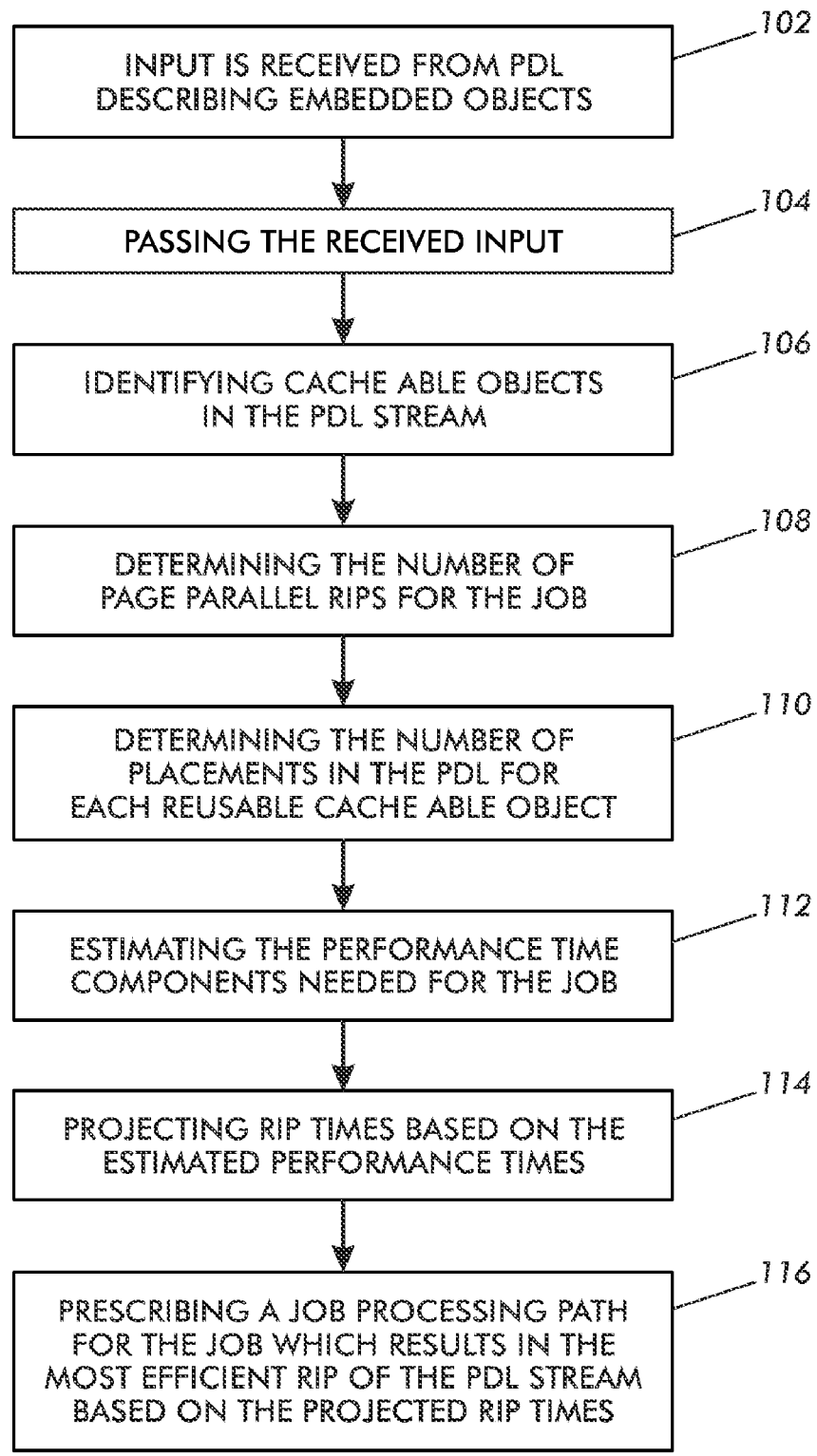
FIG. 1 illustrates a flow diagram of one embodiment of the present method for page parallel rip and cache tuning in print/copy job environments utilizing a PDL.

Reference is now being made to FIG. 1 illustrating a flow diagram of one embodiment of the present method for page parallel rip and cache tuning in print/copy job environments utilizing a PDL.

At step 102, input is received from the PDL describing the embedded objects it contains. Input can be prescribed from an external program that has already analyzed the embedded objects designed to support the present method or from reading and interperting the PDL. In the latter, only a subset of the PDL would be searched. A further determination can be made as to how much of each embedded object is used in the PDL. Alternatively, the PDL is searched off-line for embedded objects. A best guess algorithm can be utilized to enhance performance.

At step 104, the input is parsed. In one embodiment input data is parsed from a PDL to determine if any of: an embedded z-sort, VIPP-DBMF, VIPP-LCM, LCDS, or any combination of these patterns are described in the PDL and how much of it is used.

At step 106, cacheable objects (RDCs) contained in the PDL stream are identified. Cacheable objects in a PDL include, for example, XObjects in PDF, and execform operations in PostScript. Other cacheable RDCs may be defined depending on a user's system configuration and job processing requirements and objectives.

A record of the parsed PDL content can be stored in a configuration database. The configuration database can also store the location of all the reusable cacheable objects and their location in the job. The database can be referenced later by a single process or queried concurrently by multiple processes. The database can be, for instance, co-located on a server, or contained locally either on a hardware or software construct. The database can be distributed across printing systems by a mounted shared device. One skilled in this art would be readily familiar with persistent databases, and storing and retrieving records/data from a database. As such, a discussion as to database design has been omitted.

At step 108, the number of page parallel rips (PPRs) is determined based on system resources and process requirements. In one embodiment, the number of PPRs depends on the number and speed of CPUs, available RAM, disk bandwidth, specialized hardware, and network speed. Other dependencies are envisioned depending on the end-user's system configuration and other job processing requirements. The number of PPRs will likely remain the same for a given hardware configuration.

At step 110, a determination is then made as to how many placements are in the PDL for each RDC. Based on the determination of the number of placements in the PDL, if no RDCs are placed more than once, caching is disabled and any further RDC-specific calculations discussed herein further can be omitted. If the PDL is constructed in a way that is not efficient to split into smaller tasks, each consisting of a subset of pages from the original stream, PPR is disabled and any PPR-specific calculations discussed herein further can be omitted. PDL streams that are not page independent require certain pages to be processed as part of the same PDL stream. If the stream is constructed so that it is difficult to find the page boundaries, the amount of time spent to split the stream into smaller tasks may outweigh the benefits of processing the tasks in parallel.

At step 112, performance time components needed for caching and/or PPR decision-making are estimated. Performance time components include one or more of the following:
- a) PDL Splitting time—Time required to create multiple shorter jobs out of a single larger job.
- b) RIP Setup time—Time required for process initialization and any PDL operations from the original job that must be performed even for a smaller subset of pages.
- c) Form Processing time (without making RDCs)—Time required to interpret and image commands within a form.
- d) RDC Creation Overhead time—Difference in processing time between processing a form without making an RDC and processing a form with RDC creation.
- e) RDC Placement time—Time required to draw a cached RDC onto a page.
- f) Propagation of RDCs to other PPR Processes time—Time required for inter-process communication to provide notification that an RDC has been cached and is available for placement.
- g) Non-reusable PDL Component Processing time—Time required for PDL commands for drawing on a page that are not contained within RDCs.

In an alternative embodiment, heuristics are used to approximate overall time.

At step 114, various RIP times for each available path are projected. Projected times are given as follows:
- a) Total non-caching non-PPR time=RIP setup time+$\Sigma$ (form processing time*number of placements)+non-reusable processing time.
- b) Total caching non-PPR time=RIP setup time+$\Sigma$(form processing time+RDC creation overhead time)+$\Sigma$(RDC placement time*number of placements)+non-reusable processing time.
- c) Total non-caching PPR time=RIP setup time+PDL splitting time+(($\Sigma$(form processing time*number of placements)+non-reusable processing time)/number of PPRs).
- d) Total caching PPR time=RIP setup time+PDL splitting time+($\Sigma$(form processing time+RDC creation overhead time)+$\Sigma$(RDC placement time*number of placements)+non-reusable processing time)/number of PPRs+time to propagate RDCs to other PPR processes.

At step 116, a job processing path can be prescribed which results in the most efficient RIP of the PDL stream based on the above-identified time projections. Complex printer/copier settings can be set based on the determined path. Detail error reporting can alternatively be documented in a log file if the prescribed path does not meet or exceed a predetermined confidence level.

The present method is described algorithmically so it can readily ported to a variety of tools and PDL analyzers which are widely available such as, for example, Creo Variable Print Specification (VPS), Postscript PDL describers, Adobe Postscript programing language, and the VIPP library.

The present method is implemented as a stand-alone interpreter, embedded in the Digital Front End (DFE), or ported to a wide array of tools and PDL analyzers that are widely used today such as, for example, Creo Variable Print Specification (VPS), Postscript PDL describers, Adobe Postscript programing language, and the VIPP library (a Freeflow VI Suite by Xerox).

It should be understood that the flow diagrams depicted herein are illustrative. Other operations, for example, may be added, modified, enhanced, condensed, integrated, or consolidated. Variations thereof are envisioned and are intended to fall within the scope of the appended claims.

Figure 2:
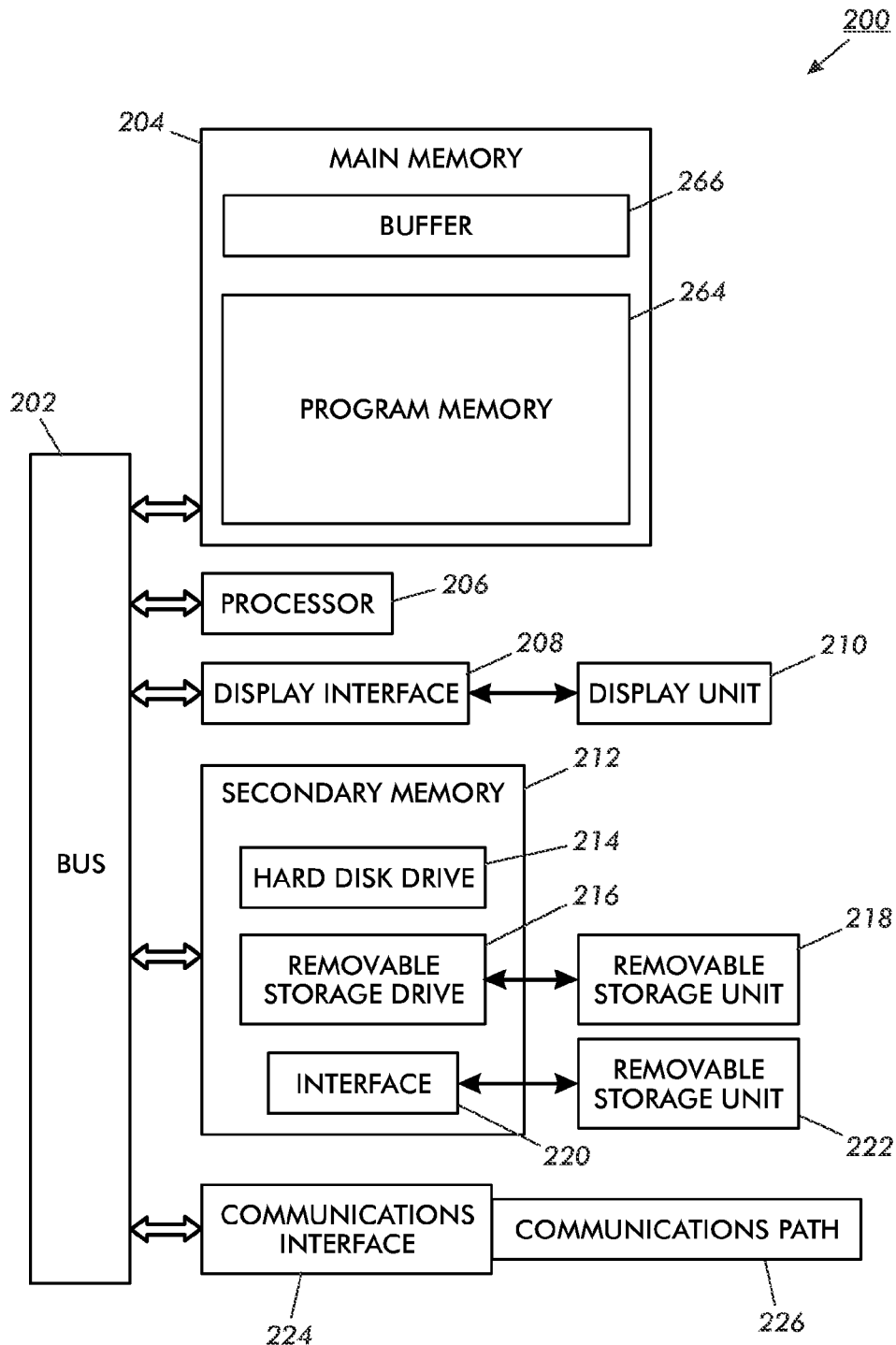
FIG. 2 is a block diagram of a computer system useful for implementing one embodiment of the method illustrated in the flow diagram of FIG. 1.

Reference is now being made the system of FIG. 2 illustrating one embodiment of a block diagram of a computer system useful for implementing the method illustrated in the flow diagram of FIG. 1.

The computer system 200 can be a xerographic system, a photocopier, or printing device. The computer system includes one or more processors, such as processor 206 capable of executing machine executable program instructions. In the embodiment shown, the processor is in communication with bus 202 (e.g., a backplane interface bus, crossover bar, or data network). The computer system also includes a main memory 204 that is used to store machine readable instructions to be executed by the processor. The main memory is capable of storing data used by or produced by the processor. The main memory may alternatively include random access memory (RAM) to support reprogramming and flexible data storage.

In the embodiment shown, main memory includes buffer 266 to temporarily store data for access by the processor, and a program memory 264 that includes, for example, executable programs that implement the methods described herein. The program memory is capable of storing a subset of the data that is less than all of the data contained in the buffer.

Computer system 200 includes a display interface 208 that forwards data from communication bus 202 (or from a frame buffer not shown) to display 210. The computer system also includes a secondary memory 212. The secondary memory may include, for example, a hard disk drive 214 and/or a removable storage drive 216 which reads and writes to removable storage unit 218, such as a floppy disk, magnetic tape, optical disk, etc., that stores computer software and/or data.

In an alternative embodiment, the secondary memory 212 includes other similar mechanisms for allowing computer programs or other instructions to be loaded into the computer system. Such mechanisms may include, for example, a removable storage unit 222 adapted to exchange data through interface 220. Examples of such mechanisms include a program cartridge and cartridge interface (such as that found in video game devices), a removable memory chip (such as an EPROM, or PROM) and associated socket, and other removable storage units and interfaces 220 which allow software and data to be transferred from the removable storage unit to the computer system.

The computer system 200 includes a communications interface 224 which acts as both an input and an output to allow software and data to be transferred between the computer system and external devices. Examples of a communications interface include a modem, a network interface (such as an Ethernet card), a communications port, a PCMCIA slot and card, etc. Software and data transferred via the communications interface are in the form of signals which may be, for example, electronic, electromagnetic, optical, or other signals capable of being received by communications interface 224. These signals are provided to communications interface via a communications path 226 (i.e., channel) which carries signals and may be implemented using wire, cable, fiber optic, phone line, cellular link, RF, or other communications channels.

Terms such as, computer program medium, computer executable medium, computer usable medium, and computer readable medium, are used herein to generally refer to media such as main memory 204 and secondary memory 212, removable storage drive 216, a hard disk installed in hard disk drive 214, and signals. These computer program products are means for providing instructions and/or data to the computer system. The computer readable medium stores data, instructions, messages packets, or other machine readable information. The computer readable medium, for example, may include non-volatile memory, such as a floppy, ROM, flash memory, disk memory, CD-ROM, and other permanent storage useful, for example, for transporting information, such as data and computer instructions. Furthermore, the computer readable medium may comprise computer readable information in a transitory state medium such as a network link and/or a network interface, including a wired network or a wireless network, which allows a computer to read such computer readable information. Computer programs (also called computer control logic) may be stored in main memory and/or secondary memory. Computer programs may also be received via a communications interface. Such computer programs, when executed, enable the computer system to perform the features and capabilities provided herein.

It should also be understood that the method described in the flowcharts provided herewith can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine that is in turn capable of implementing one or more elements of the flow diagrams provided herewith, or portions thereof, can be used. Portions of the flow diagrams may also be implemented partially or fully in hardware in conjunction with machine executable instructions.

Furthermore, the flow diagrams hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs, or from a server.

It should also be understood that the teachings hereof can be implemented in hardware or software using any known or later developed systems, structures, devices, and/or software by those of ordinary skill in the applicable art without undue experimentation from the functional description provided herein with a general knowledge of the relevant arts. Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a printer, a photocopier, a driver, a scanner, a photographic system, a xerographic device, or the like. The methods provided herein can also be implemented by physical incorporation into an image processing, image reproduction, or color management system.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described herein. Additionally, the article of manufacture may be included as part of a xerographic system, an operating system, a plug-in, or may be shipped, sold, leased, or otherwise provided separately either alone or as part of an add-on, update, upgrade, or product suite.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

What is claimed is:

1. A method for estimating an amount of processing time for a print/copy jobs utilizing a page description language, the method comprising:
   receiving a page description language (PDL) of a page of a print job, said PDL describing objects embedded in said page and parsing said received input;
   identifying which of said objects comprise reusable document components, reusable document component being those objects in said PDL which are identified as having already been processed and are presently stored in memory;
   determining a total number of placements for said identified reusable document components;
   determining a total number of page parallel rips required to be performed on objects embedded in said page;
   estimating a total performance time for each of: a reusable document component placement time and a non-reusable page description language component processing time, said reusable document component placement time being an estimated amount of time needed to retrieve said reusable objects from memory and place each at their respective locations on said page, and said non-reusable page description language component processing time being an estimated amount of time needed to process said non-reusable objects and place each of these on said page;
   projecting a job processing time for each job processing path in said job, said projection being based on a combination of: 1) said total number of placements, 2) said total number of page parallel rips, and 3) said total performance time; and
   selecting one of said job processing paths for said job based on said projected job processing time.

2. The method of claim 1, wherein said number of page parallel rips for said job is based on system resources.

3. The method of claim 1, wherein in response to no reusable document components being placed more than once, disabling caching for said job.

4. The method of claim 1, wherein in response to it not being efficient to split said page description language into smaller tasks, disabling page parallel rip.

5. The method of claim 1, wherein said total performance time is further estimated for at least one of: caching, page parallel rip decision-making, page description language splitting time, raster image processing setup time, form processing time, reusable document component creation overhead time, and time for propagation of reusable document components to other page parallel rip processes.

6. The method of claim 1, further comprising utilizing a heuristic to estimate one of said total performance time.

7. The method of claim 1, wherein projecting said job processing time for each job processing path comprises:

total non-caching non-PPR time=RIP setup time+Σ(form processing time* number of placements)+non-reusable processing time;

total caching non-PPR time=RIP setup time+Σ(form processing time+RDC creation overhead time)+Σ(RDC placement time*number of placements)+non-reusable processing time;

total non-caching PPR time=RIP setup time+PDL splitting time+((Σ(form processing time*number of placements)+non-reusable processing time)/number of PPRs); and total caching PPR time=RIP setup time+PDL splitting time+(Σ(form processing time+RDC creation overhead time)+Σ(RDC placement time*number of placements)+non-reusable processing time)/number of PPRs+time to propagate RDCs to other PPR processes, wherein PPR is a page parallel rip, PDL splitting time is a time required to create multiple shorter jobs out of a single larger job, RIP setup time is a time required for process initialization and any PDL operations from said print job that must be performed even for a smaller subset of pages, form processing time is a time required to interpret and image commands within a form, RDC creation overhead time is a difference in processing time between processing a form without making an RDC and processing a form with RDC creation, RDC placement time is a time required to draw a cached RDC onto a page, and propagation of RDCs to other PPR Processes time is a time required for inter-process communication to provide notification that an RDC has been cached and is available for placement.

8. A system for estimating an amount of processing time for a given page of print/copy jobs utilizing a page description language, the system comprising:

a storage medium; and a processor in communication with said storage medium, said processor executing a machine readable instruction for performing the method of:

receiving a page description language (PDL) of a page of a print job, said PDL describing objects embedded in said page and parsing said received input;

identifying which of said objects comprise reusable document components, reusable document component being those objects in said PDL which are identified as having already been processed and are presently stored in memory;

determining a total number of placements for said identified reusable document components;

determining a total number of page parallel rips required to be performed on objects embedded in said page;

estimating a total performance time for each of: a reusable document component placement time and a non-reusable page description language component processing time, said reusable document component placement time being an estimated amount of time needed to retrieve said reusable objects from memory and place each at their respective locations on said page, and said non-reusable page description language component processing time being an estimated amount of time needed to process said non-reusable objects and place each of these on said page;

projecting a job processing time for each job processing path in said job, said projection being based on a combination of: 1) said total number of placements, 2) said total number of page parallel rips, and 3) said total performance time; and selecting one of said job processing paths for said job based on said projected job processing time.

9. The system of claim 8, wherein said number of page parallel rips for said job is based on system resources.

10. The system of claim 8, wherein in response to no reusable document components being placed more than once, disabling caching for said job.

11. The system of claim 8, wherein in response to it not being efficient to split said page description language into smaller tasks, disabling page parallel rip.

12. The system of claim 8, wherein said total performance time is further estimated for at least one of: caching, page parallel rip decision-making, page description language splitting time, raster image processing setup time, form processing time, reusable document component creation overhead time, and time for propagation of reusable document components to other page parallel rip processes.

13. The system of claim 8, further comprising utilizing a heuristic to estimate one of said total performance time.

14. The system of claim 8, wherein projecting said job processing time for each job processing path comprises:

total non-caching non-PPR time=RIP setup time+Σ(form processing time* number of placements)+non-reusable processing time;

total caching non-PPR time=RIP setup time+Σ(form processing time+RDC creation overhead time)+Σ(RDC placement time*number of placements)+non-reusable processing time;

total non-caching PPR time=RIP setup time+PDL splitting time+((Σ(form processing time*number of placements)+non-reusable processing time)/number of PPRs); and total caching PPR time=RIP setup time+PDL splitting time+(Σ(form processing time+RDC creation overhead time)+Σ(RDC placement time*number of placements)+non-reusable processing time)/number of PPRs+time to propagate RDCs to other PPR processes, wherein PPR is a page parallel rip, PDL splitting time is a time required to create multiple shorter jobs out of a single larger job, RIP setup time is a time required for process initialization and any PDL operations from said print job that must be performed even for a smaller subset of pages, form processing time is a time required to interpret and image commands within a form, RDC creation overhead time is a difference in processing time between processing a form without making an RDC and processing a form with RDC creation, RDC placement time is a time required to draw a cached RDC onto a page, and propagation of RDCs to other PPR Processes time is a time required for inter-process communication to provide notification that an RDC has been cached and is available for placement.

15. A computer program product for estimating an amount of processing time for a given page of print/copy jobs utilizing a page description language, the computer program product comprising:
- a non-transitory computer readable medium for storing instructions that, when executed on a computer, cause the computer to perform a method comprising:
  - receiving a page description language (PDL) of a page of a print job, said PDL describing objects embedded in said page and parsing said received input;
  - identifying which of said objects comprise reusable document components, reusable document component being those objects in said PDL which are identified as having already been processed and are presently stored in memory;
  - determining a total number of placements for said identified reusable document components;
  - determining a total number of page parallel rips required to be performed on objects embedded in said page;
  - estimating a total performance time for each of: a reusable document component placement time and a non-reusable page description language component processing time, said reusable document component placement time being an estimated amount of time needed to retrieve said reusable objects from memory and place each at their respective locations on said page, and said non-reusable page description language component processing time being an estimated amount of time needed to process said non-reusable objects and place each of these on said page;
  - projecting a job processing time for each job processing path in said job, said projection being based on a combination of: 1) said total number of placements, 2) said total number of page parallel rips, and 3) said total performance time; and
  - selecting one of said job processing paths for said job based on said projected job processing time.

16. The computer program product of claim 15, wherein said number of page parallel rips for said job is based on system resources.

17. The computer program product of claim 15, wherein in response to no reusable document components being placed more than once, disabling caching for said job.

18. The computer program product of claim 15, wherein in response to it not being efficient to split said page description language into smaller tasks, disabling page parallel rip.

19. The computer program product of claim 15, wherein said total performance time is further estimated for at least one of: caching, page parallel rip decision-making, page description language splitting time, raster image processing setup time, form processing time, reusable document component creation overhead time, and time for propagation of reusable document components to other page parallel rip processes.

20. The computer program product of claim 15, further comprising utilizing a heuristic to estimate one of said total performance time.

21. The computer program product of claim 15, wherein projecting said job processing time for each job processing path comprises:
- total non-caching non-PPR time=RIP setup time+$\Sigma$(form processing time* number of placements)+non-reusable processing time;
- total caching non-PPR time=RIP setup time+$\Sigma$(form processing time+RDC creation overhead time)+$\Sigma$(RDC placement time*number of placements)+non-reusable processing time;
- total non-caching PPR time=RIP setup time+PDL splitting time+(($\Sigma$(form processing time*number of placements)+non-reusable processing time)/number of PPRs); and
- total caching PPR time=RIP setup time+PDL splitting time+($\Sigma$(form processing time+RDC creation overhead time)+$\Sigma$(RDC placement time*number of placements)+non-reusable processing time)/number of PPRs+time to propagate RDCs to other PPR processes, wherein
- PPR is a page parallel rip,
- PDL splitting time is a time required to create multiple shorter jobs out of a single larger job,
- RIP setup time is a time required for process initialization and any PDL operations from said print job that must be performed even for a smaller subset of pages,
- form processing time is a time required to interpret and image commands within a form,
- RDC creation overhead time is a difference in processing time between processing a form without making an RDC and processing a form with RDC creation,
- RDC placement time is a time required to draw a cached RDC onto a page, and
- propagation of RDCs to other PPR Processes time is a time required for inter-process communication to provide notification that an RDC has been cached and is available for placement.

* * * * *